(12) United States Patent
Qian

(10) Patent No.: US 6,486,642 B1
(45) Date of Patent: Nov. 26, 2002

(54) TAPPED-INDUCTOR STEP-DOWN CONVERTER AND METHOD FOR CLAMPING THE TAPPED-INDUCTOR STEP-DOWN CONVERTER

(75) Inventor: Jinrong Qian, Plano, TX (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/918,959

(22) Filed: Jul. 31, 2001

(51) Int. Cl.[7] .................................................. G05F 1/24
(52) U.S. Cl. ...................................... 323/259; 323/255
(58) Field of Search ................................ 323/222, 225, 323/282, 284, 255, 259, 290

(56) References Cited

U.S. PATENT DOCUMENTS 3,781,654 A * 12/1973 Simcoe .................... 323/290 X
4,504,896 A *  3/1985 Easter et al. ............. 323/222 X
6,094,038 A *  7/2000 Lethellier ..................... 323/282

* cited by examiner

Primary Examiner—Jessica Han

(57) ABSTRACT

A tapped-inductor step-down converter and method for clamping same with a clamping capacitor so that MOSFETs can be employed to improve circuit efficiency. The converter includes a tapped-inductor and clamping capacitor uniquely arranged to eliminate resonance between the leakage energy of the leaky inductance and the clamping capacitor. Moreover, such arrangement provides for the recycling or recovering of the leakage energy from a leaky inductance of the tapped-inductor to further improve circuit efficiency.

19 Claims, 4 Drawing Sheets

TAPPED-INDUCTOR STEP-DOWN CONVERTER AND METHOD FOR CLAMPING THE TAPPED-INDUCTOR STEP-DOWN CONVERTER

FIELD OF THE INVENTION

This invention relates to buck converters, and more particularly to a tapped-inductor step-down converter and method for clamping same.

BACKGROUND OF THE INVENTION

The ever-present demands for faster and more efficient data processing have prompted a significant development effort in the area of low voltage integrated chips (ICs). Currently, 3.3-V ICs are gradually replacing the standard 5-V ICs due to their better speed, power consumption performance and higher integration densities. However, the 3.3-V IC is only a traditional stage to ICs with ever lower voltages that will not only improve the speed and reduce the power consumption of ICs but also will allow direct, single-cell battery operation. It is expected that next generations of the data processing ICs will require power supply with voltages in the 1–3 V range. At the same time, since more devices are integrated on a single processor chip and the processors operate at higher frequencies, microprocessors need aggressive power management. Future generation processors' current draw will increase from 13A to 50A–100A and the load range may reach 1:100. On the other hand, as the speed of the ICs increases, they are becoming more dynamic loads to their power supplies. The next generation microprocessors are expected to exhibit current slew rates of 50A/ms. Moreover, the output voltage regulation becomes much tighter from 5% to 2%. All requirements pose very serious design challenges. Voltage regulator modules (VRMs), which feed the microprocessors, have to have high efficiency, fast transient response and high power density.

A conventional synchronized buck converter, such as shown in FIG. 1, is typically used as a VRM to meet these requirements. The conventional synchronized buck converter includes two switches S1 and S2 which are turned on and off in a complementary manner, output capacitor $C_{O1}$ and load $R_{L1}$. The voltage gain for the conventional synchronized buck converter of FIG. 1 is given by $$D = \frac{Vo}{V\text{in}} \quad \text{Eq. (1)}$$

where D is the duty ratio or cycle of switch S1. It has been well established that the conventional buck converter has better efficiency for a duty cycle D of 0.5. For an input voltage Vin of 5V and an output voltage Vo of 2V, the duty cycle D is 0.4, which is good to achieve high efficiency.

Since the future VRM should provide more power to the microprocessor, the power switch has to deal with high current, which decreases efficiency. The higher the input voltage Vin, the lower the input current so as to reduce the conduction loss. If the input voltage Vin to the VRMs increases from 5V to 12V, then the current rating for the buck switch is significantly reduced, which increases efficiency. Therefore, the VRMs would need a 12V or higher input voltage Vin. According to Severns et al., "Modern DC-To-DC Switch Mode Power Converter Circuits," TK7868, 1984, pg. 178, the duty cycle D for the conventional synchronized buck converter is as small as 0.15V with 12V input. This will result in poor performances in terms of voltage regulation and transient response.

FIGS. 2 and 3 illustrate a conventional tapped-inductor synchronized buck converter and the switching waveforms thereof, respectively. In operation, when switch S11 is turned on and switch S12 is turned off during time the interval T1 to T2, the voltage Vin-Vo is applied to the windings N1 and N2 of the tapped-inductor. The input voltage Vin is from a DC voltage source 2 and the output voltage Vo is across a load $R_{L10}$. The conventional tapped-inductor synchronized buck converter delivers power to the output. At time T2, switch S11 turns off and switch S12 turns on. The energy stored in winding N1 is transferred to winding N2 and the winding current $I_{N2}$ flows through switch S12. The voltage gain of the conventional tapped-inductor synchronized buck converter is given by $$\frac{Vo}{V\text{in}} = \frac{D}{1 + \frac{N1}{N2}*(1-D)} \quad \text{Eq. (2)}$$

From Eq. (2), it can be readily seen that approximately a 0.5 duty cycle (D) can be obtained to achieve high efficiency by properly choosing the turns ratio of the windings N1 and N2 of the tapped-inductor. However, the main problem is that there exists a high voltage spike across switch S11 when switch S11 turns off because the leakage energy of leakage inductance Lk of winding N1 can not be transferred to winding N2. Instead, the leakage energy of leakage inductance Lk charges the output capacitor $C_{s1}$ of the switch S1 (not shown) through conducting switch S12, which causes a high voltage stress across switch S11. As a result, the high voltage rating metal-oxide semiconductor field-effect transistor (MOSFET) has to be used. The MOSFET has a high on-resistance with a high voltage rating, which significantly increases the power loss and reduces the efficiency.

FIG. 3 illustrates the switching waveforms of the switches S11 and S12, currents $I_{S11}$ and $I_{S12}$ and the voltage stress $V_{S11}$ and $V_{S12}$ across switches S11 and S12, respectively.

As can be readily seen, there is a continuing need to improve the VRM performance to meet these requirements.

SUMMARY OF THE INVENTION

Broadly, the present invention contemplates a tapped-inductor step-down converter and method for clamping same so that low voltage rating MOSFETs can be used to improve the efficiency of the converter. The converter includes a tapped-inductor and a clamping capacitor which are uniquely arranged to recycle the leakage energy from a leaky inductance of the tapped-inductor and to eliminate resonance between the leakage energy of the leaky inductance and the clamping capacitor.

DETAILED DESCRIPTION OF THE INVENTION

Figure 1:
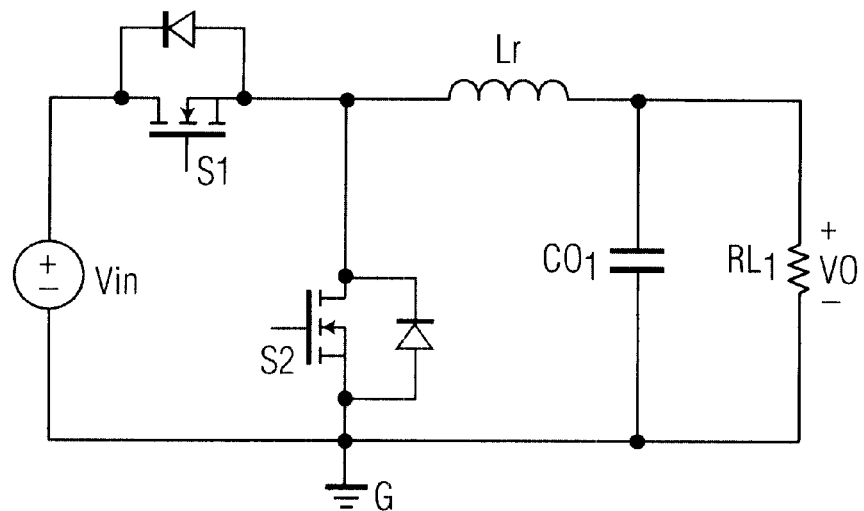
FIG. 1 illustrates a schematic diagram of a conventional synchronized buck converter.
Figure 2:
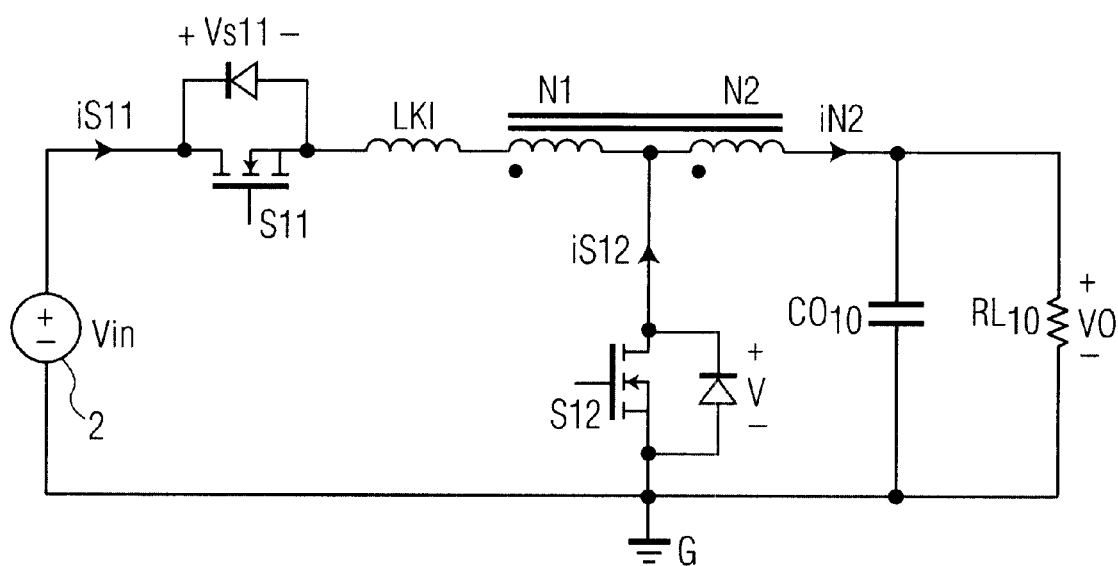
FIG. 2 illustrates a schematic diagram of a conventional tapped-inductor synchronized buck converter.
Figure 3:
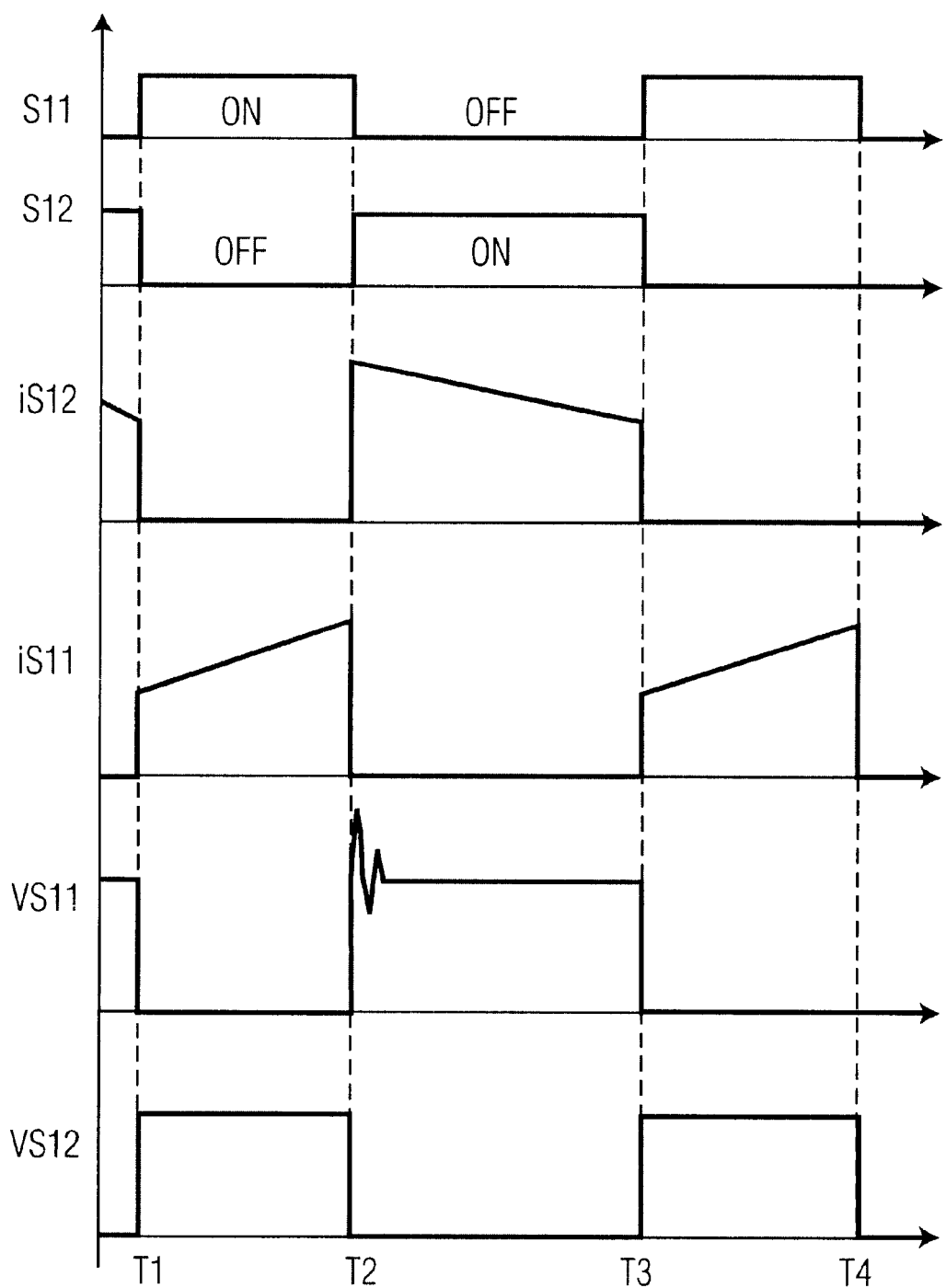
FIG. 3 illustrates the switching waveforms of the conventional tapped-inductor synchronized buck converter of FIG. 2.
Figure 4:
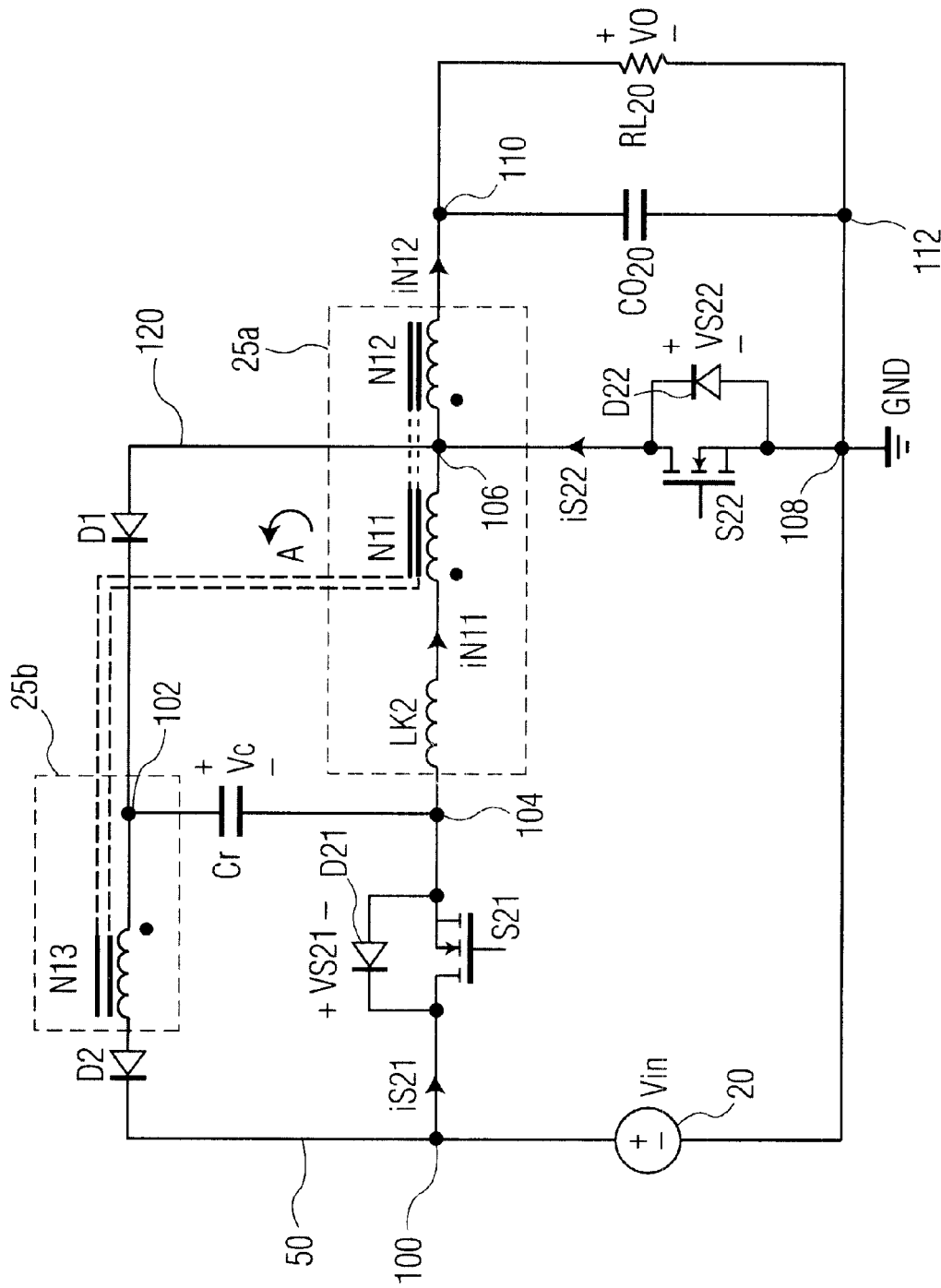
FIG. 4 illustrates a schematic diagram of a tapped-inductor step-down converter of the present invention.

FIG. 4 illustrates an exemplary embodiment of the schematic diagram of a tapped-inductor step-down converter 10 according to the present invention which includes a clamping capacitor Cr so that low voltage rating MOSFETs can be used for the two complementarily switched switches S21 and S22 to improve the efficiency of converter 10. The converter 10 further includes a unique arrangement between a tapped-inductor 25a and 25b, having three windings N11, N12, and N13, and the clamping capacitor Cr to recycle the leakage energy from a leaky inductance Lk2 of the tapped-inductor 25a and 25b and to eliminate resonance between the leakage energy of the leaky inductance Lk2 and the clamping capacitor Cr, which further improved efficiency. Additionally, such arrangement creates varying clamping voltages Vc.

The schematic diagram of the tapped-inductor step-down converter 10 converts a DC input voltage Vin to a DC output voltage Vo. Converter 10 will now be described in detail. The positive side of the DC voltage source 20 delivering input voltage Vin is coupled to the input voltage node 100. From the input voltage node 100 there are two general input paths, the first path $I_{S21}$ and the second path 50. The cathode of diode D2 of the second path 50 and the drain of the MOSFET or switch S21 of the first path $I_{S21}$ are coupled to the input voltage node 100. MOSFET or switch S21 has a body diode D21 integrated therewith wherein the anode is coupled to the source and the cathode is coupled to the drain of the MOSFET or switch S21. The drain of the MOSFET or switch S21 is coupled to node 104. The anode of diode D2 is in series with the undotted terminal of winding N13 of the converter's storage inductor 25a and 25b, which will be described in detail below.

Referring now to the converter's storage inductor 25a and 25b, the storage inductor 25a and 25b is generally comprised of windings N11, N12 and N13 wrapped by a single wire around a single magnetic core, as illustrated by the dashed lines, separated by taps 102 and 106. The number of turns in winding N11 and the number of turns in winding N12 separated by tap 106 are not necessarily the same. Moreover, the number of turns in winding N13 separated by tap 102 may also be different from the number of turns in either of windings N11 and N12. By convention, the current flowing through windings N11, N12 and N13 flows into the dotted terminal and out of the undotted terminal. The dotted terminal of winding N13, the first terminal of the clamping capacitor Cr and the cathode of diode D1 are coupled to tap 102. The second terminal of the clamping capacitor Cr is coupled to node 104. The second terminal of the clamping capacitor Cr and the dotted terminal of winding N11 via the first side of leakage inductance Lk2 are coupled to node 104. The second side of the leakage inductance Lk2 is coupled to the first terminal of the winding N11. The undotted terminal of the winding N11, the dotted terminal of N12, and the anode of diode D1 are coupled to tap 106. As can be readily seen, a path 102 couples taps 102 and 106 of the storage inductor 25a and 25b together via diode D1. The operation of the storage inductor 25a and 25b will be made apparent based on the description provided with regard to the overall operation of the converter 10.

Loop A, defined by the loop from node 104, tap 106, tap 102 via diode D1 and back to node 104, is a recycling loop to recover the leakage energy from the leakage inductance Lk2, as will be described in more detail below. Moreover, the loop A in combination with the windings N11, N12 and N13 via taps 102 and 106 of the loop A charges the clamping capacitor Cr to a clamping voltage set forth in Eq. (3) during a first time interval when MOSFET or switch S21 is in an on-state and to a clamping voltage set forth in Eq. (4) during a second time interval immediately following the first time interval to clamp the voltage stress $V_{S21}$ across MOSFET or switch S21 when it is in an off-state. Diode D2, in series with winding N3, stops the resonance between the leakage inductance Lk2 and the clamping capacitor Cr. The resonance stops because the current through D2 is unidirectional not bidirectional.

The undotted terminal of winding N12 and the first terminal of $C_{O20}$ are coupled to node 110. Switch S22 has a body diode D22 integrated therewith wherein the anode is coupled to the source and the cathode is coupled to the drain of MOSFET or switch S22. The negative side of the DC voltage source 20 and the source of MOSFET or switch S22 are coupled to node 108. Node 108 is coupled to ground GND. The second terminal of capacitor $C_{O20}$ is coupled to node 112. Node 112 is coupled to ground GND. Load $R_{L20}$ is coupled across nodes 110 and 112 and is parallel to the output capacitor $C_{O20}$.

Those skilled in the art would understand that when the switches are in the "on-state" they are conducting current therethrough and when they are in the "off-state" they are not conducting current therethrough. Furthermore, methodologies for controlling MOSFET switches so that they are conducting or non-conducting has been well established. Thus, no further discussion is necessary.

Figure 5:
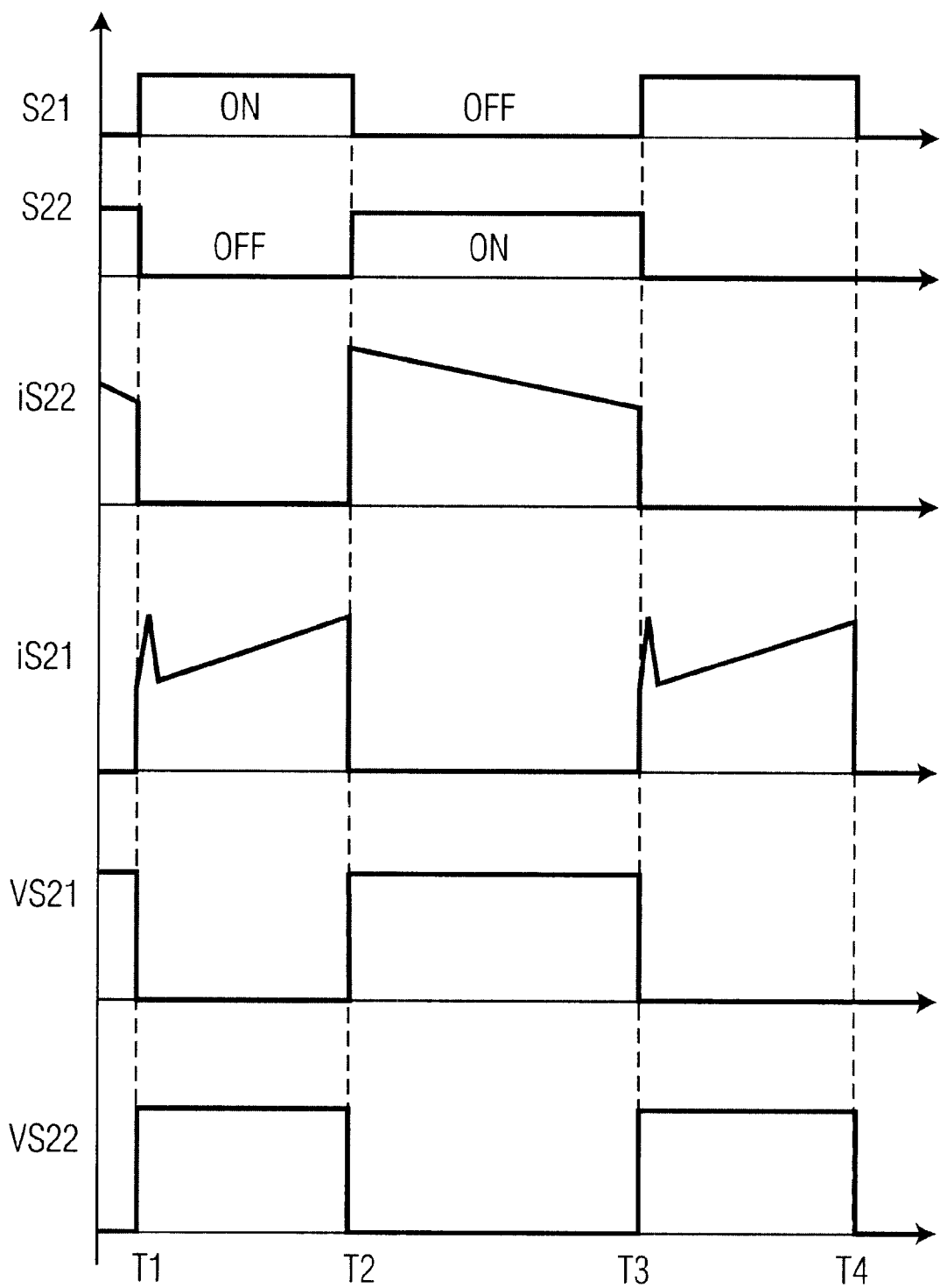
FIG. 5 illustrates the switching waveforms of the tapped-inductor step-down converter of the embodiment of FIG. 4.

Referring also to FIG. 5, the switching waveforms of the switches S21 and S22, currents $I_{S21}$ and $I_{S22}$ and the voltage stress $V_{S21}$ and $V_{S22}$ across MOSFETs or switches S21 and S22, respectively, are illustrated. The operation of converter 10 will now be described in detail with respect to the switching waveforms of FIG. 5.

Assume that before T1, MOSFET or switch S21 is switched to an off-state and MOSFET or switch S22 is switched to an on-state. At time T1, MOSFET or switch S21 is switched to an on-state and MOSFET or switch S22 is switched to an off-state. The voltage Vc of clamping capacitor Cr is applied to the winding N13. The energy stored in clamping capacitor Cr is transferred to the output or load $R_{L20}$ through the windings N11, N12 and N13 until the voltage Vc gradually changes and is finally clamped to a reflected voltage from N1 and N2, which is given by $$Vc = \frac{N3}{N1 + N2} * (Vin - Vo) \qquad \text{Eq. (3)}$$

MOSFET or switch S21 remains in the on-state and MOSFET or switch S22 remains in the off-state for a time period or until time T2.

At time T2, MOSFET or switch S21 transitions to an off-state and MOSFET or switch S22 transitions to an on-state. At such time, diode D2, in the second path 50, conducts, the energy stored in winding N11 is transferred to winding N12 and the current in winding N12 flows through MOSFET or switch S22. However, the leakage energy of leakage inductance Lk2 is not transferred to winding N12. Instead, diode D1, in a conducting state, in path 120 between taps 102 and 106, passes the leakage energy of leakage inductance Lk2 therethrough to the clamping capacitor Cr. Diode D1 is conducting only when switch S21 is off and S22 is on. The leakage energy charges the clamping capacitor Cr. The voltage Vc is given by $$Vc = \frac{N1}{N2} * Vo \qquad \text{Eq. (4)}$$

Moreover, the voltage stress across switch $V_{S21}$ is the sum of the input voltage Vin and the voltage Vc and is expressed as $$V_{S21} = V\text{in} + \frac{N1}{N2} * Vo \qquad \text{Eq. (5)}$$

In view of the foregoing, the voltage stress across switch S21, when switch S21 is in the off-state, is clamped, as best seen in FIG. 5. Thus, high voltage spikes across switch S21 are essentially eliminated. Furthermore, the leakage energy of the leakage inductance LK2 from winding N11 is recovered when switch S21 is on and is delivered to the output or load $R_{L20}$ instead of charging output capacitor $C_{O20}$. Thus, the converter 10 has a higher efficiency.

MOSFET or switch S21 remains in the off-state and MOSFET or switch S22 remains in the on-state for a time period or until time T3, which ends a complementary periodic cycle. In other words, from time T3 to time T4, switch S21 is in the on-state and switch S22 is in the off-state and so on and so forth. During the complementary periodic cycle, the voltage Vc of the clamping capacitor Cr varies between equations (3) and (4).

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method of clamping a tapped-inductor step-down converter having a tapped-inductor, the method comprising the steps of:
   (a) complementarily switching a first switch to an off-state and maintaining the off-state for a time interval and switching a second switch to an on-state and maintaining the on-state for the time interval;
   (b) clamping a voltage across the first switch during the time interval via a clamping capacitor; and,
   (c) during the step (b), transferring the leaky energy of a leaky inductance of a tapped-inductor to the clamping capacitor to recover the leaky energy.

2. The method according to claim 1, further comprising the steps of:
   (d) stopping resonance between the clamping capacitor and the leakage inductance of the tapped-inductor; and,
   (e) delivering the leakage energy to an output of the converter.

3. The method according to claim 1, further comprising the steps of:
   (d) transferring energy stored in a first winding having the leakage inductance to a second winding of the tapped-inductor, and
   (e) flowing current in the second winding to the second switch; and
   wherein the step (c) includes the step of:
      (c1) during the step (d), charging the clamping capacitor with the leakage inductance.

4. The method according to claim 3, wherein the voltage Vc across the clamping capacitor is given by $$Vc = \frac{N1}{N2} * Vo$$

wherein N1 is the first winding of the tapped-inductor, N2 is the second winding of the tapped-inductor and Vo is an output voltage.

5. The method according to claim 4, wherein the voltage stress Vs across the first switch is the sum of a DC input voltage Vin and the voltage Vc and is expressed as $$V_s = V\text{in} + \frac{N1}{N2} * Vo.$$

6. The method according to claim 1, further comprising the steps of:
   (d) complementarily switching the first switch to an on-state and maintaining the on-state for a second time interval and switching the second switch to an off-state and maintaining the off-state for the second time interval;
   (e) transferring a voltage across the clamping capacitor to a third winding of the tapped-inductor; and,
   (f) transferring energy stored in the clamping capacitor to a pair of first and second tapped windings until the voltage across the clamping capacitor is clamped to a reflected voltage from the pair of first and second windings.

7. The method according to claim 6, wherein the voltage Vc across the clamping capacitor is given by $$Vc = \frac{N3}{N1 + N2} * (V\text{in} - Vo)$$

wherein N1 is the first winding having the leaky inductance of the tapped-inductor, N2 is the second winding of the tapped-inductor, N3 is the third winding of the tapped-inductor, Vin is a DC input voltage and Vo is an output voltage.

8. The method according to claim 1, wherein the first and second switches are low voltage rating MOSFETS.

9. A tapped-inductor step-down converter comprising:
   complementarily switched first and second switches;
   a parallel combination output capacitor and load;
   a tapped-inductor coupled between the first and second switches having a leaky inductance; and,
   a clamping capacitor constructed and arranged with the tapped-inductor to clamp a voltage across the first switch, when the first switch is off, to recycle leakage energy from the leaky inductance of the tapped-inductor and to eliminate resonance between the leakage energy of the leaky inductance and the clamping capacitor.

10. The converter to claim 9, wherein the tapped-inductor includes:
    first, second and third windings wherein the first winding, having the leaky energy, is tapped to the second winding at a tap and the third winding is coupled to the first and second windings via a path having a diode coupled therealong wherein the second switch is coupled to the tap.

11. The converter according to claim 10, further comprising:

a DC voltage source providing an input voltage;

a first input path having the first switch coupled thereto; and, a second input path having a second diode, an anode of the second diode is coupled to the DC voltage source and a cathode of the second diode is coupled in series with the undotted terminal of the third winding.

12. The converter according to claim 10, wherein the clamping capacitor has a first terminal coupled to the third winding and the diode; and a second terminal coupled to the first switch and the first winding wherein the leaky energy is transferred to the clamping capacitor and a voltage across the clamping capacitor, when the first switch is in an off-state, clamps the first switch.

13. The converter according to claim 9, wherein the first and second switches are low voltage rating MOSFETs.

14. A tapped-inductor step-down converter comprising:

first and second switches turned on and off in a complementary manner between an on-state and an off-state;

an output capacitor;

a load coupled in parallel with the output capacitor;

a tapped storage inductor having first, second and third windings wherein the first winding, having leaky energy, is tapped to the second winding at a tap and the third winding is coupled to the first and second windings via a path having a diode coupled therealong wherein the second switch is coupled to the tap; and, a clamping capacitor having one terminal coupled to the third winding and the diode and the other terminal coupled to the first switch and the first winding wherein leaky energy is transferred to the clamping capacitor and a voltage across the clamping capacitor when the first switch is in an off-state clamps the first switch.

15. The converter according to claim 14, further comprising:

a DC voltage source providing an input voltage;

a first input path having the first switch coupled thereto; and, a second input path having a second diode, an anode of the second diode is coupled to the DC voltage source and a cathode of the second diode is coupled in series with the undotted terminal of the third winding.

16. The converter according to claim 15, wherein when the first switch is in the off-state, the voltage across the clamping capacitor is given by $$Vc = \frac{N1}{N2} * Vo$$

wherein N1 is the first winding of the tapped-inductor, N2 is the second winding of the tapped-inductor and Vo is an output voltage.

17. The converter according to claim 16, wherein the voltage stress across the first switch is the sum of a DC input voltage Vin and the voltage Vc and is expressed as $$Vs = V\text{in} + \frac{N1}{N2} * Vo.$$

18. The converter according to claim 15, wherein when the second switch is in the off-state, the voltage across the clamping capacitor charges until it reaches a reflected voltage given by $$Vc = \frac{N3}{N1 + N2} * (V\text{in} - Vo)$$

wherein N1 is the first winding of the tapped-inductor, N2 is the second winding of the tapped-inductor, N3 is the third winding of the tapped-inductor, Vin is a DC input voltage and Vo is an output voltage.

19. The converter according to claim 14, wherein the first and second switches are low voltage rating MOSFETs.

* * * * *